(12) United States Patent
Sotgiu et al.

(10) Patent No.: US 8,082,787 B2
(45) Date of Patent: Dec. 27, 2011

(54) APPARATUS FOR MEASURING FORCES WHICH ARE PRODUCED BY AN UNBALANCE OF A ROTARY MEMBER

(75) Inventors: Paolo Sotgiu, Modena (IT); Lillo Gucciardino, Bomporto (IT)

(73) Assignee: Snap-On Equipment SRL a Unico Socio, Corregio (RE) (IT)

( * ) Notice: Subject to any disclaimer, the term of this patent is extended or adjusted under 35 U.S.C. 154(b) by 322 days.

(21) Appl. No.: 12/478,899

(22) Filed: Jun. 5, 2009

(65) Prior Publication Data

US 2010/0000319 A1    Jan. 7, 2010

(30) Foreign Application Priority Data

Jul. 3, 2008 (EP) .................................... 08012037

(51) Int. Cl.
*G01M 1/16* (2006.01)
(52) U.S. Cl. ........................................ 73/460
(58) Field of Classification Search ................ 73/460, 73/66

See application file for complete search history.

(56) References Cited

U.S. PATENT DOCUMENTS 5,189,912 A * 3/1993 Quinlan et al. ............... 73/462
6,430,992 B1 * 8/2002 Goebel ............................ 73/66

FOREIGN PATENT DOCUMENTS

EP    1 108 204 B1    3/2002

OTHER PUBLICATIONS

European Search Report issued in European Patent Application No. 08012037.1, mailed Feb. 26, 2009.

* cited by examiner

*Primary Examiner* — Lisa Caputo
*Assistant Examiner* — Octavia Davis
(74) *Attorney, Agent, or Firm* — McDermott Will & Emery LLP

(57) ABSTRACT

Apparatus for measuring forces which are produced by an unbalance of a rotary member, the apparatus including a measuring shaft (2) which is supported in a rotary mounting (26) rotatably about its axis (23) and to which the rotary member (1) is fixed for the measurement operation, and a support device (3) having force measuring sensors (4, 5) for supporting the measuring shaft (2) on a stationary frame (6), wherein the support device (3) has an intermediate frame (7) on which the measuring shaft is supported in a mounting plane having a force measuring sensor (4), the intermediate frame (7) is supported on the stationary frame (6) by way of a further force measuring sensor (5) and by way of a first pair (11, 12) of support levers and pivots (15 to 18), the rotary mounting (26) is fixedly connected to a stiff holding device (29) at an axial spacing with respect to the mounting plane (8) in which the force measuring sensors (5, 6) are disposed, the holding device (29) is supported on the intermediate frame (8) by way of a second pair (13, 14) of support levers and pivots (19 to 22), and the support levers (11 to 14) are formed by stiff flat members arranged between the associated pivots (15 to 22).

6 Claims, 5 Drawing Sheets

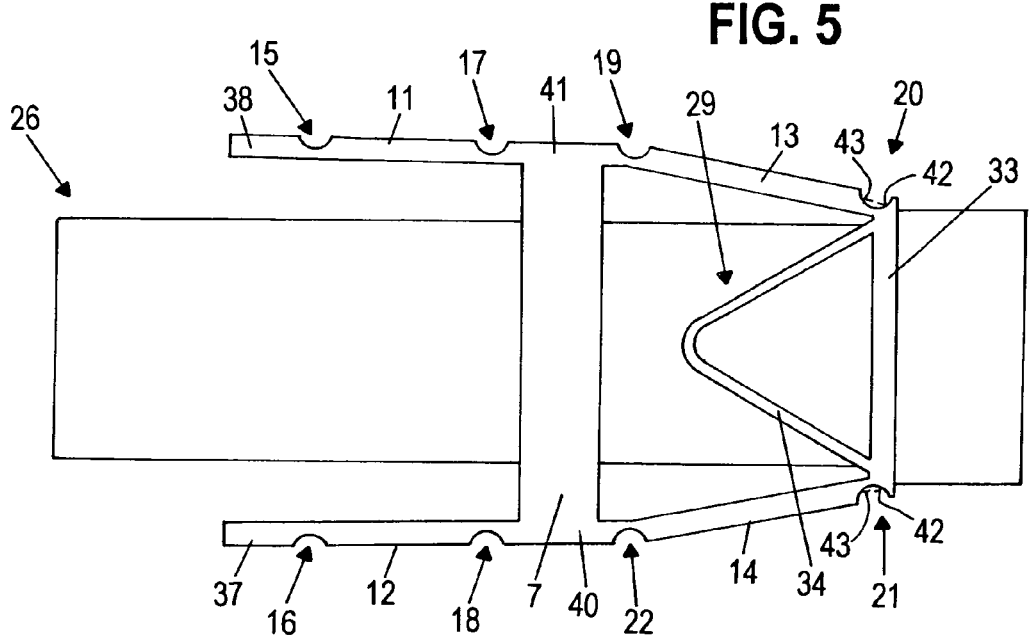
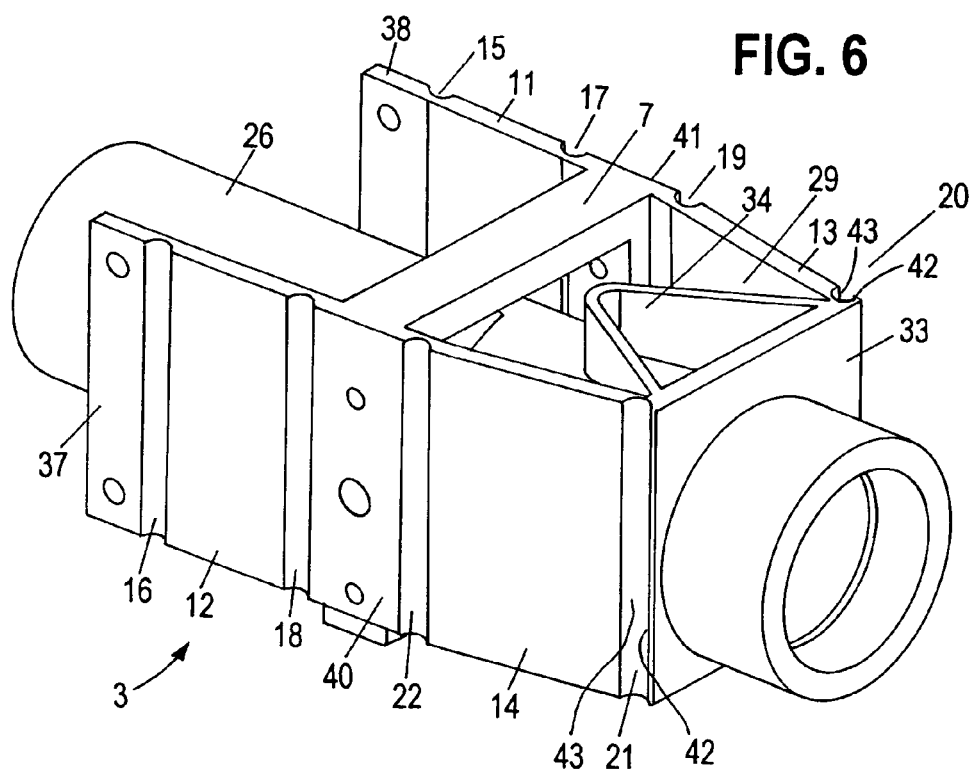

APPARATUS FOR MEASURING FORCES WHICH ARE PRODUCED BY AN UNBALANCE OF A ROTARY MEMBER

BACKGROUND

The invention concerns apparatuses as set forth in the preamble of claim 1, as are known form EP 1 108 204 B1. The known apparatus for measuring forces which are produced by an unbalance of a rotary member, comprises a measuring shaft which is supported in a rotary mounting rotatably about its axis and to which the rotary member is fixed for the measurement operation, and a support means having force measuring sensors for supporting the measuring shaft on a stationary frame, wherein the support means has an intermediate frame on which the measuring shaft is supported in a mounting plane having force measuring sensors and in addition the measuring shaft is supported on the intermediate frame and the intermediate frame on the stationary frame in a respective virtual mounting location formed by support levers.

The known apparatus provides measuring results with high accuracy.

SUMMARY OF THE INVENTION

The problem to be solved by the invention is that of providing an apparatus of the kind set forth in the introductory part of this specification, which has a compact structure and can be produced easily.

That problem is solved by the features of claim 1. The subclaims disclose advantageous modifications of the invention.

The intermediate frame is supported on a stationary frame by way of a pair of support levers and pivots at the respective ends of the support levers. The measuring shaft is also supported on the intermediate frame by way of a pair of support levers and pivots at the lever ends. The axes of the respective pivots extend perpendicularly to the plane in which the forces applied to the force measuring sensors and the axis of the measuring shaft lie. The pair of support levers which supports the intermediate frame on the stationary frame can at the same time provide for parallel guidance of the intermediate frame on the stationary frame. For that purpose the support levers extend in mutually parallel relationship. It is however also possible for the support levers to be arranged at an angle relative to each other, in which the apex of the angle is preferably on the axis of the measuring shaft or in the proximity of that axis of the measuring shaft. The pivots of the support levers are then in the corners of a trapezium of the arrangement in plan view of the supports levers. That arrangement provides the virtual mounting location at the outer side of the rotary member. The virtual mounting location of the measuring shaft on the intermediate frame, which is within the rotary member, in particular between the balancing planes, can also be formed by support levers which are at an angle relative to each other and whose pivots are in the corners of a trapezium in plan view of the arrangement of the support levers. Preferably the support levers are in the form of flexurally stiff flat members, for example sheet metal members, cast members, rolled flat members and the like, which together with the pivots ensure that the forces are applied to the measuring sensors in the desired manner, for example substantially linearly and coaxially. The support arrangement for the measuring shaft, namely a rotary mounting in which the measuring shaft is rotatably supported, a holding device which connects the rotary mounting to the support levers, the support levers, associated pivots and the intermediate frame can be made from one piece, especially by one cast piece. The flat members are flexurally stiff and only the interposed pivots which extend substantially linearly are flexurally elastic and form pivot springs. The pivots can be formed by weak locations, for example constrictions, between the individual flexurally stiff flat members. That forms flexurally elastic pivot axes between the flexurally stiff flat members. Then, as discussed above, the corresponding arrangement, parallel or at an angle, affords the desired virtual mounting locations which form mounting axes extending linearly in the respective mounting planes.

The virtual mounting locations are also the measuring locations which are taken into consideration in the mainframe computer of the balancing machine and which represent virtual mounting locations.

Each of the two pivots which connect the pair of the support levers to the rotary mounting is formed partly as a segment into the structure of the holding device which is fixedly connected to the rotary mounting and the remaining segment of the pivot is formed into the structure of the associated support lever.

Preferably each pivot acts as a pivot spring and has a concave, particularly semicircular cross-section. The two pivot segments which are formed into the structures of the holding device and of the associated support lever can be provided with the same dimensions and can have an approximately quartercircular cross-section.

BRIEF DESCRIPTION OF THE DRAWINGS

The invention will be described in greater detail hereinafter by means of embodiments with reference to the Figures in which:

FIG. 5 shows a plan view of a support arrangement for the measuring shaft including the invention, and FIG. 6 is a perspective view of the support arrangement of FIG. 5 above.

DETAILED DESCRIPTION

Figure 1:
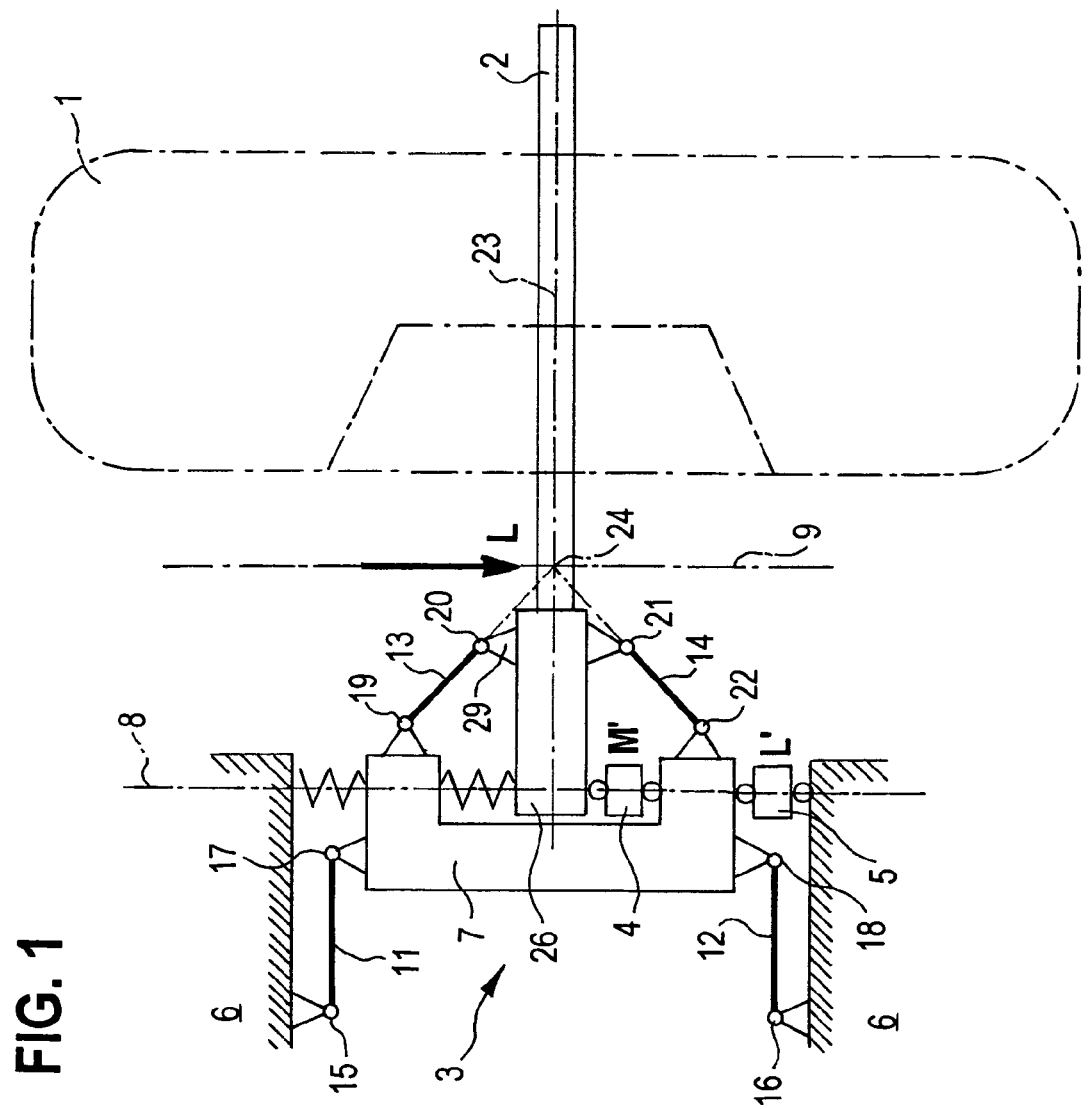
FIG. 1 shows schematically a first embodiment, in which the invention can be implemented.

The figures show diagrammatic views of a rotary member 1 which for unbalance measurement is fixed to a measuring shaft 2 in known manner by clamping means (not shown). The measuring shaft 2 is supported rotatably at a stationary frame 6. This can involve the machine frame of a wheel balancing machine. Support is afforded by means of a support means 3 which will be described in greater detail hereinafter and which also has force measuring sensors 4, 5. The support means 3 can have a tubular rotary mounting 26 in which the measuring shaft 2 is rotatably supported. The rotary mounting 26 which receives the measuring shaft 2 is rigidly supported in a first mounting plane 8 on an intermediate frame 7 by way of the force measuring sensor 4. Furthermore, support levers 13, 14 which form a pair of support levers and which extend at an angle to each other provide a virtual support location 24 in a further mounting plane 9. The support location 24 acts as a pivot axis which extends perpendicularly to the axis 23 of the measuring shaft 2 and perpendicularly to the direction of application of the reaction forces resulting from unbalance measurement, to the force measuring sensor 4. At their ends the support levers 13 and 14 are connected to the intermediate frame 7 pivotably (pivot 19 and 22) and to the rotary mounting 26 for the measuring shaft 2 pivotably (pivots 20, 21). The pivot axes of the pivots 19 to 22 extend parallel to the pivot axis which is formed in the virtual mounting location 24. The virtual mounting location 24 can be between the rotary member 1 and the mounting plane 8 in which the force measuring sensors 4 and 5 are disposed (FIG. 1). The virtual mounting location 24 can however also be disposed in the region of the rotary member, in particular between balancing planes 27 and 28 in which the balancing procedure is effected, for example by fitting balancing weights (FIG. 2).

The intermediate frame 7 is supported on the stationary frame 6 by way of the force measuring sensor 5. The force measuring sensor 5 can be arranged in the mounting plane 8 which is perpendicular to the measuring shaft 2. It is however also possible for the force measuring sensor 5 to be arranged displaced in the axial direction of the measuring shaft 2 in another mounting plane. Preferably, the force measuring sensor 5 and 6 are disposed such that they are sensitive in the same direction in which the forces applied to the sensors are operative. In addition the intermediate frame 7 is supported on the stationary frame 6 by way of a pair of support levers (support levers 11 and 12). The support levers 11, 12 are connected at the ends to the stationary frame 6 pivotably (pivots 15, 16) and pivotably (pivots 17, 18) to the intermediate frame 7. The intermediate frame 7 is the form of a rigid mounting unit or a rigid and flexurally stiff mounting frame.

Figure 2:
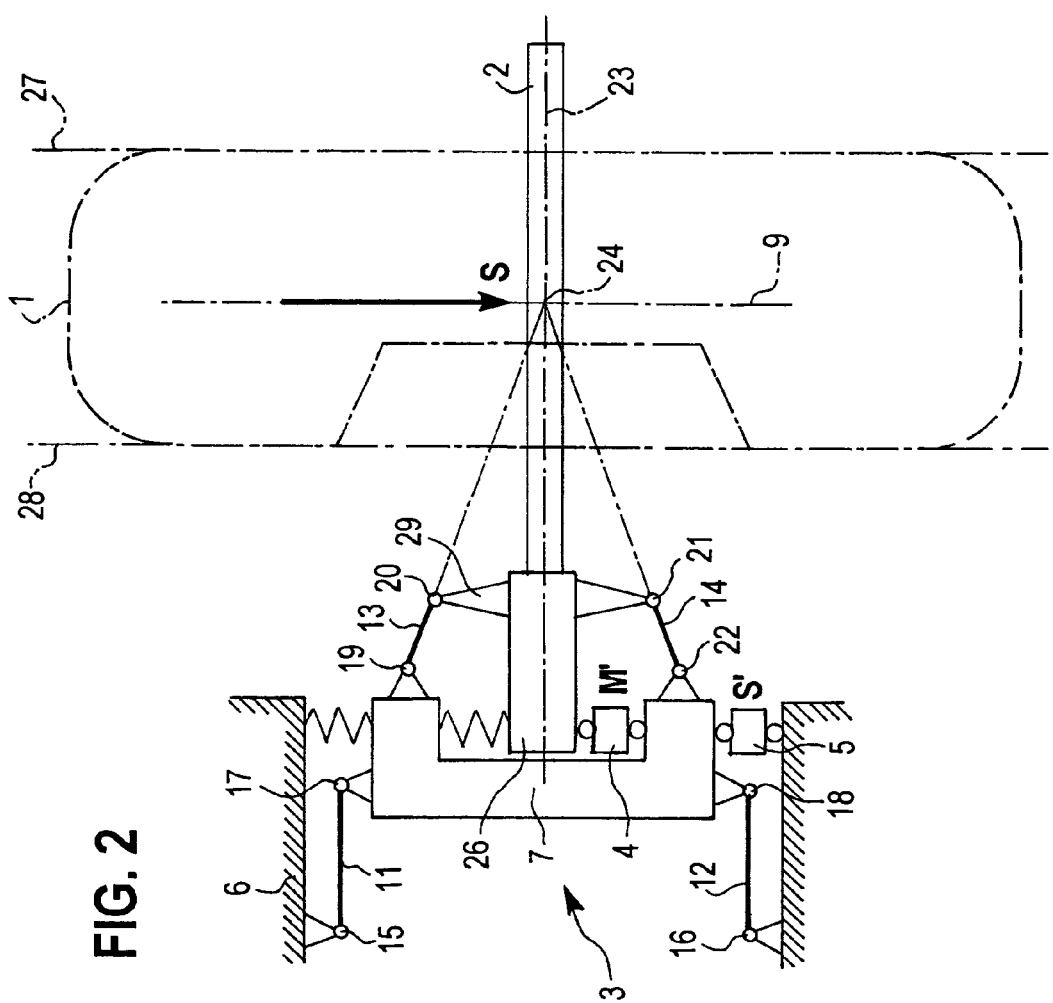
FIG. 2 shows schematically a second embodiment, in which the invention can be implemented.
Figure 4:
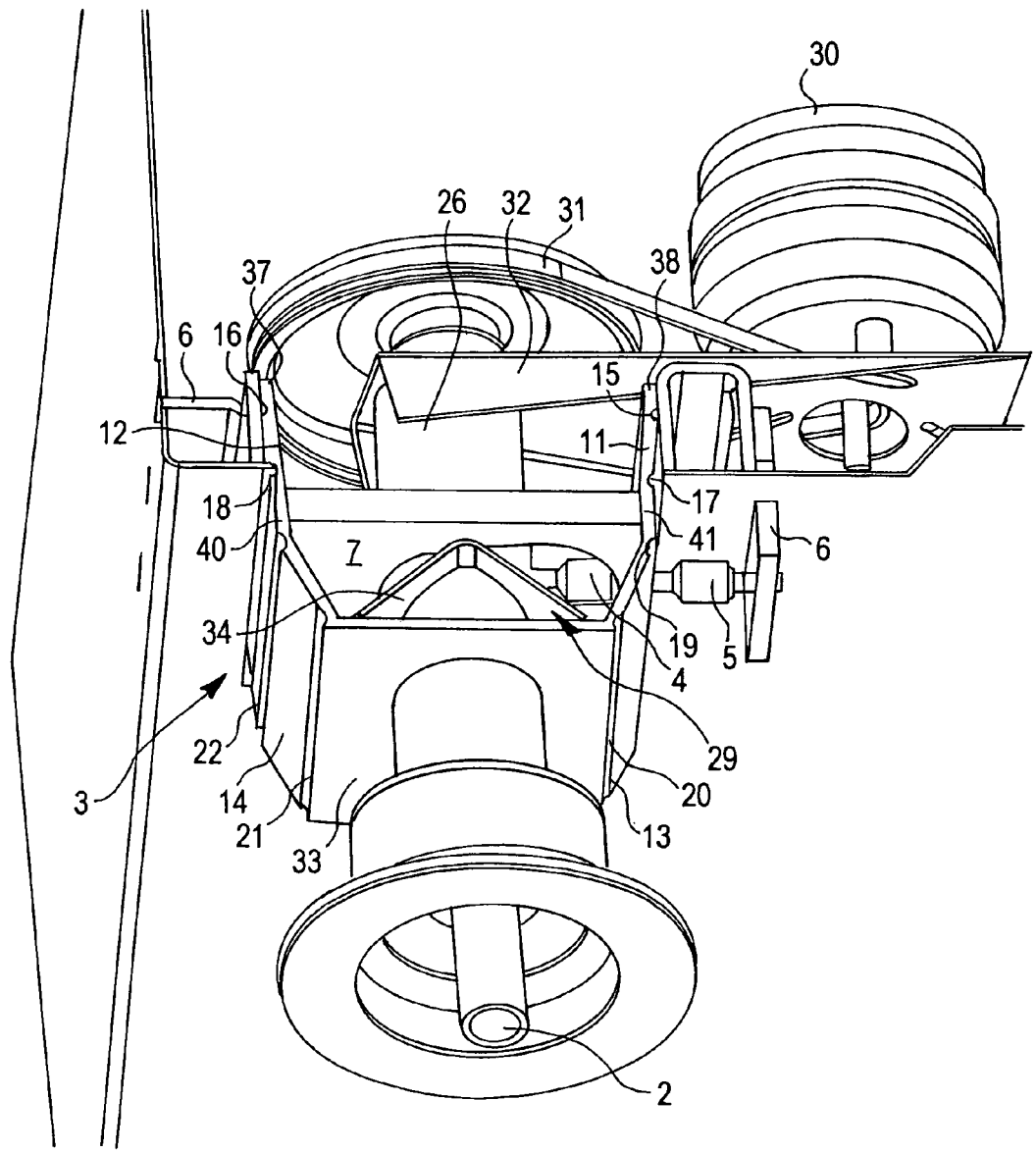
FIG. 4 is a perspective view of the measuring arrangement seen from above, in which the invention is implemented.

In the embodiments of FIGS. 1 and 2 and well as FIGS. 4 to 6 the support levers 11 and 12 extend substantially parallel to each other and parallel to the axis 23 of the measuring shaft 2. The support levers 11 and 12 thus form a parallel link guide arrangement for application of the reaction forces which occur in the unbalancing measuring run, to the force measuring sensor 5, in such a way as to be directed substantially perpendicularly to the axis 23 of the measuring shaft 2.

Figure 3:
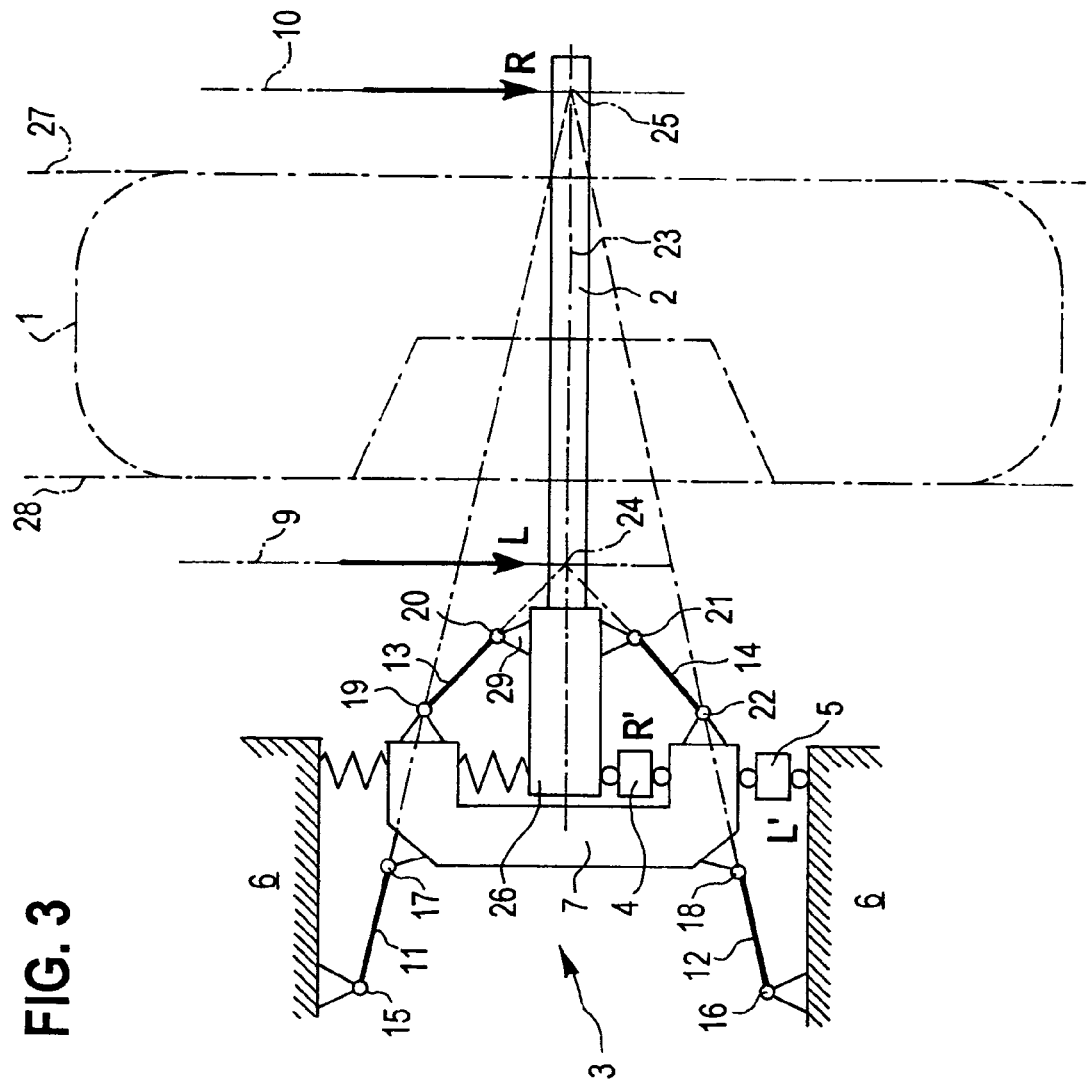
FIG. 3 shows schematically, in which the invention can be implemented.

In the embodiment of FIG. 3 the two support levers 11 and 12 are arranged at an acute angle relative to each other, whose apex is on the axis 23 of the measuring shaft 2 or in the proximity of the axis 23. That apex forms a further virtual mounting location 25 in a mounting plane 10 which extends perpendicularly to the measuring shaft 2 and which is at the outside of the rotary member 1.

The virtual mounting location 25 also has the property of a pivot axis which is perpendicular to the axis 23 of the measuring shaft 2 and perpendicular to the direction of application of the forces to the force measuring sensors 4 and 5. In the illustrated embodiments such forces are applied in the mounting plane 8 and are operative preferably in a coaxial direction onto the force measuring sensors 4 and 5. To form the pivot axis property at the respective virtual mounting location 24, 25, the pivot axes of the pivots 15 to 22 extend parallel to each other and perpendicular to the axis 23 of the measuring shaft 2 and with respect to the direction in which the reaction forces are applied to the force measuring sensors 4 and 5 in the mounting plane 8.

In the embodiment of FIG. 3, mounting planes 9 and 10 with the mounting locations 24 and 25 are provided at both sides of the rotary member 18, namely at the inside and the outside of the rotary member. The virtual mounting locations 24 and 25 have the properties of virtual measuring locations. Forces L associated with the inner mounting location 24 are applied to the force measuring sensor 5 and forces R associated with the mounting location 25 are applied to the force measuring sensor 4. The force measuring sensors produce corresponding measuring sensor signals L' and R. The fact that virtual measuring locations are also afforded in the virtual mounting locations 24 and 25 is due to the point that, when a centrifugal force resulting from unbalance of the rotary member is effective in the left balancing plane 9 a measuring signal L' which is proportional to the magnitude of that centrifugal force is produced by the force measuring sensor 5 while the force measuring sensor 4 does not deliver any signal. If a centrifugal force R resulting from unbalance of the rotary member acts in the right outer mounting and plane 10, only the force measuring sensor 4 produces a proportional measuring signal R' while the force measuring sensor 5 does not produce any signal. That affords a cantilever support means in which the balancing planes 27 and 28 on the rotary member 1 are between the virtual measuring locations or virtual measuring planes which are identical to the mounting planes 9 and 10, as is shown in FIGS. 3 and 4. In the event of a force acting between the mounting planes 9 and 10, resulting from unbalance of the rotary member, the mounting forces which are operative in those planes (virtual measuring planes), are divided up corresponding to the mounting spacings from the point of application of the force, and corresponding measuring sensor signals are outputted by the force measuring sensors 4 and 5.

In the embodiments the support for the intermediate frame 7 on the stationary frame 6 is afforded by means of the pair of support levers 11 and 12 and support for the tubular rotary mounting 26 of the measuring shaft 2 is afforded by means of the pair of support levers 13 and 14, arranged one behind the other as viewed in the axial direction of the measuring shaft 2.

The support levers 11 to 14 can be formed by flat members which are of a rigid and flexurally stiff configuration. The flat members can be formed from one piece, in which respect the pivots are formed by linear weak locations, for example in the form of constrictions. As can be seen from FIG. 4, a holding plate 33 can also be formed from the piece which forms the flat members for the support levers 11 to 14. The holding plate 33 is a component part of the holding device 29. The holding plate 33 is fixedly connected to the tubular rotary mounting 26, for example by welding. In addition, it is also possible to provide as a component part of the holding device 29 an angle support member 34 which is also fixedly connected to the holding plate 33 and the rotary mounting 26 by for example welding. The FIG. 4 shows the upper angle support member 34. It is in addition also possible to provide a lower angle support member. The upper and lower angle support members can also comprise one angle portion in which the rotary mounting 26 is guided through an opening in the angle portion and fixedly connected to the angle portion for example by welding. That provides a rigid and flexurally stiff connection of the holding device 29 to the rotary mounting 26 between the two pivots 20 and 21. The pivots 20 and 21 are disposed between the two support levers 13 and 14 and the holding plate 33. As shown in FIGS. 5 and 6, the concave surfaces of the two pivots 20 and 21 have segments 42 which are formed into the material of the holding plate 33 and forms the side edges of the holding plate 33. The cross-section of the pivots 20 and 21 and of the other pivots 15-19, 22 are semicircular and the cross-sections of the segments 42 are approximately quartercircular. Remaining segments 43 of the surfaces of the pivots 20 and 21 are formed into the support levers 13 and 14. The surfaces of the segments 42 face substantially the mounting plane 8 in which the force measuring sensors 4, 5 are disposed. In a preferred embodiment of the invention, the complete support as shown in the FIGS. 5 and 6 and including the rotary mounting 26, the holding device 29, the support levers 11-14 and the pivots 15-22 is formed from one piece, particularly from a cast piece. The surfaces of all concave pivots 15-22 are disposed on the outer side surfaces of the support assembly, as shown in FIGS. 5 and 6. Such an arrangement provides an easier production process. In the way practically the entire support means 3 with which the measuring shaft 2 is supported on the stationary frame 6 and which predetermines the virtual mounting locations and measuring locations can be formed from one piece.

Fixing plates 37, 38, and 40, 41 can also be formed from the one cast piece from which the support assembly is formed. The fixing plates 37, 38 are fixedly connected to the stationary frame 6, for example by screw connections or in some other way. The fixing plates 37 and 38 form the fixing locations for the support lever arm which is formed from the support levers 11 and 12 and with which the intermediate frame 7 is supported on the stationary frame 6. Provided between the fixing plates 37 and 38 and the flat members which form the support levers 11 and 12 are the pivots 15 and 16 formed by the linear weak locations or constrictions. The weak locations are of a concave and in particular semicircular cross-section.

The two fixing plates 40 and 41 are also formed from the one portion, and are provided on the side surfaces of the intermediate frame 7. The pivots 17 and 18 are formed by the weak locations or constrictions between the two fixing plates 40 and 41 and the support levers 11 and 12. The pivots 19 and 22 are formed by weak locations or constrictions between the flat members which form the support levers 13 and 14.

In that way practically the entire support means 3 with which the measuring shaft 2 is supported on the stationary frame 6 and which predetermines the virtual mounting locations and measuring locations can be formed from one piece.

As can also be seen from the Figures, the two force measuring sensors 4, 5 are arranged in an operative line, wherein the force measuring sensor 4 is arranged between the rotary mounting 6 and the inside of the intermediate frame 7 and the force measuring sensor 5 is arranged between the outside of the intermediate frame 7 or the fixing plate 41 (FIG. 4) and the stationary frame 6. The forces to be measured act along the one co-axial operative line onto the measuring sensor 4, 5. Provided for driving the measuring shaft 2 is an electric motor 30 which drives the measuring shaft by way of a belt drive 31. The motor 30 is mounted to the rotary mounting 26 by way of a cantilever arm 32. That mounting arrangement provides that the measurement result is not influenced by disturbances resulting from the motor drive.

Viewed in the axial direction, the invention provides a compact support means 3 for the measuring shaft 2 on the stationary frame 6. In conjunction with the reduced force dynamics, particularly when the measuring shaft 2 is supported in cantilever relationship, that results in a reduction in the influence of changes in sensitivity of the force pick-up means, for example as a consequence of different effects of temperature, ageing, impact, overloading, transport vibration and moisture, a reduced necessity for replacement of the force measuring sensors, re-adjustment operations on the measuring arrangement after transportation and setting-up of the machine, reduced service costs, improved measuring accuracy, reduced levels of demand in terms of the resolution of the AD-converter in digitisation of the analog measuring signals and a large virtual spacing of the measuring planes in spite of the measuring planes in spite of the compact structure involved. In spite of the measuring shaft being supported in a lying position, the arrangement affords a reduced force dynamic similarly to that of a measuring arrangement with two mounting locations at both sides of the rotary member.

The invention claimed is:

1. Apparatus for measuring forces which are produced by an unbalance of a rotary member, comprising
a measuring shaft (2) which is supported in a rotary mounting (26) rotatably about its axis (23) and to which the rotary member (1) is fixed for the measurement operation, and
a support means (3) having force measuring sensors (4, 5) for supporting the measuring shaft (2) on a stationary frame (6), wherein
the support means (3) has an intermediate frame (7) on which the measuring shaft (2) is supported in a mounting plane having a force measuring sensor (4),
the intermediate frame (7) is supported on the stationary frame (6) by way of a further force measuring sensor (5) and by way of a first pair (11, 12) of support levers and pivots (15 to 18),
the rotary mounting (26) is fixedly connected to a stiff holding device (29) at an axial spacing with respect to the mounting plane (8) in which the force measuring sensors (5, 6) are disposed,
the holding device (29) is supported on the intermediate frame (8) by way of a second pair (13, 14) of support levers and pivots (19 to 22),
the holding device (29) has in a plan view a triangular form and comprises an angle support member (34) fixedly connected to a holding plate (33) which extends perpendicularly to the axis (23) of the measuring shaft (2),
the support levers (11 to 14) are formed by stiff flat members arranged between the associated pivots (15 to 22), and
the pivots (15 to 22) are in the form of linearly extending weak locations with a concave cross-section, having axes extending substantially perpendicularly to the direction in which the forces applied to the force measuring sensors (4, 5) are operative, and
in addition the measuring shaft (2) is supported on the intermediate frame (7) and the intermediate frame (7) on the stationary frame (6) in a respective virtual mounting location (24, 25) formed by support levers (11, 12, 13, 14),
characterized in that
a first segment (42) of each of the two pivots (20, 21) which connect the second pair of support levers (13, 14) to the holding device (29) is formed into the material of the holding device (29) and the remaining second segment (43) of the pivot is formed into the material of the respective support lever (13, 14),
the first segment (42) of the pivot (20, 21) is formed into the material of the holding plate (33),
the first segment (42) of the pivot (20, 21) forms the side edge of the holding plate (33), wherein the surface of the first segment (42) of the pivot (21, 22) is directed substantially to the mounting plane (8) in which the force measuring sensors (5, 6) are disposed, and
the surfaces of the concave pivots (15 to 22) are disposed on the outer side surfaces of the support means (3).

2. Apparatus according to claim 1, characterized in that the segments (42, 43) have about the same dimensions.

3. Apparatus according to claim 1 or 2, characterized in that each pivot (15 to 22) has a semicircular cross-section.

4. Apparatus according to any one of the claims 1 to 3, characterized in that the force measuring sensors (5, 6) are disposed such that the forces applied during a measurement run to the force measuring sensors (5, 6) have the same direction, particularly along one operative line.

5. Apparatus according to any one of the claims 1 to 4, characterized in that the rotary mounting (26), the holding device (29), the support levers (11 to 14) and the associated pivots (15 to 22) are formed from one piece, particularly from one cast piece.

6. Apparatus according to any one of the claims 1 to 5, characterized in that the pivots (15 to 22) are configured to act as pivot springs.

* * * * *